United States Patent [19]
Burke et al.

[11] 3,900,184
[45] Aug. 19, 1975

[54] ROLLER CLAMP FOR TUBING

[75] Inventors: George K. Burke; Kenneth Raines; Robert J. Le Fevre, all of Bethlehem, Pa.

[73] Assignee: Burron Medical Products, Inc., Bethlehem, Pa.

[22] Filed: Dec. 13, 1973

[21] Appl. No.: 424,323

[52] U.S. Cl. .................................. 251/6; 24/115 L
[51] Int. Cl.² .......................................... F16K 7/06
[58] Field of Search............... 251/4, 6, 9; 24/115 L, 24/136 A; 403/374

[56] References Cited
UNITED STATES PATENTS
3,533,439 10/1970 Hall .................................... 251/6 X
3,685,787 8/1972 Adelberg ................................ 251/6

*Primary Examiner*—Martin P. Schwadron
*Assistant Examiner*—Richard Gerard
*Attorney, Agent, or Firm*—Shoemaker and Mattare

[57] ABSTRACT

A roller clamp for tubing, comprising an elongate tubular body having an axially extending opening therethrough with a ramp at one side of the opening, said ramp having an elongate, axially extending channel therein of increasing depth toward one end thereof, a roller in the opening for rolling movement thereof axially of the body, the roller including a finger engaging portion accessible exteriorly of the body for manually rolling the roller axially of the body, said roller having opposite faces and a coaxial, reduced diameter tubing engaging portion projecting from one face thereof and extending transversely across the ramp and channel for clamping a length of flexible tubing between the tubing engaging portion and the ramp, and between a side wall of the body and said one face of the finger engaging portion to deform a portion of the tubing into the channel and thus control flow through the tubing.

12 Claims, 14 Drawing Figures

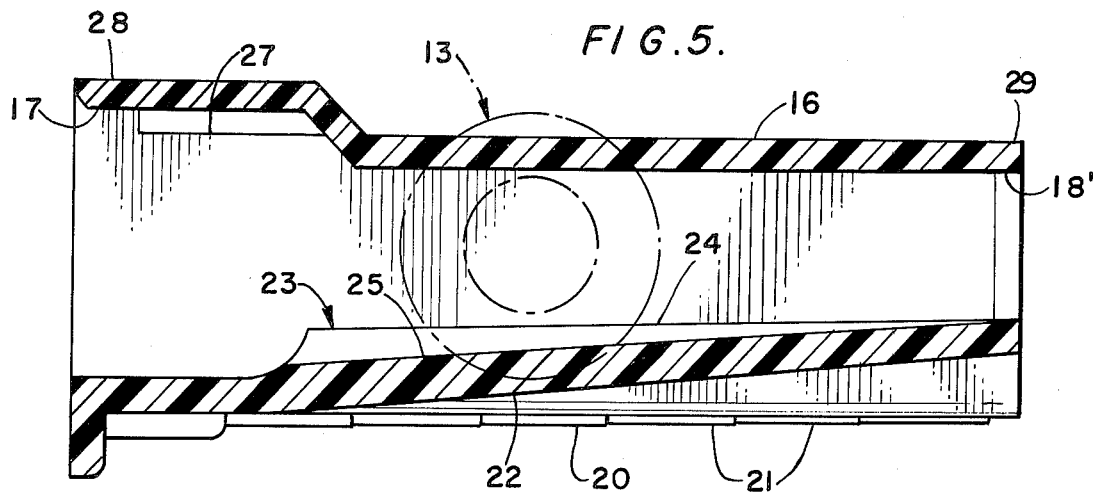
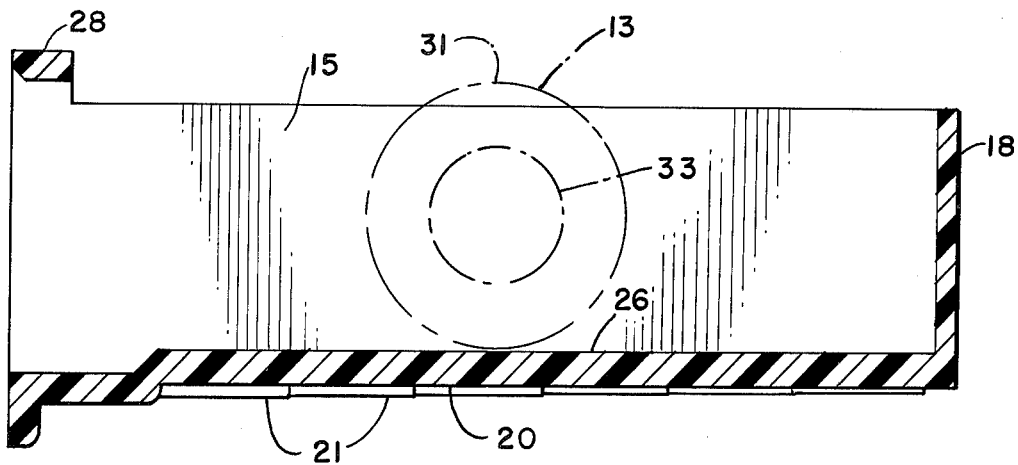
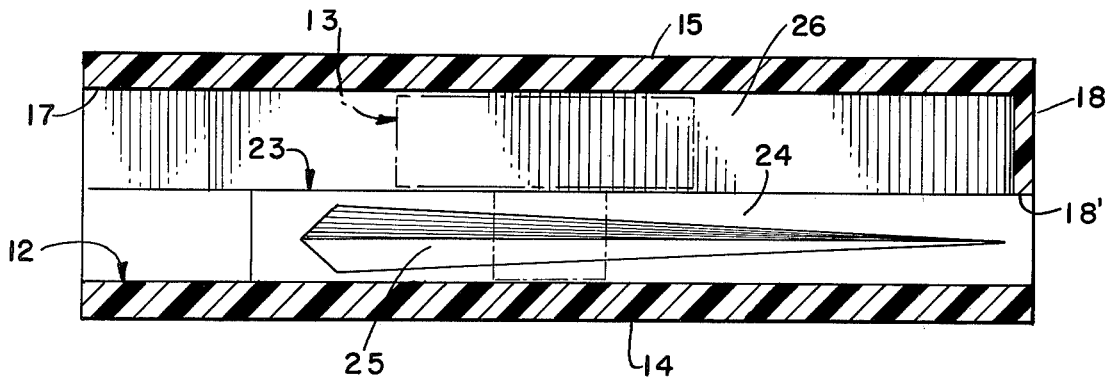

ROLLER CLAMP FOR TUBING

BACKGROUND OF THE INVENTION

This invention relates to roller clamps for tubing. In particular, the roller clamp of the invention is simple in construction and economical to manufacture and is durable in operation. Further, the roller clamp of the invention has a tubing engaging portion of small diameter in relation to a finger engaging portion whereby manipulation of the finger engaging portion provides increased leverage for easier rolling of the clamp. In addition, the motion of the finger engaging portion is substantially reduced relative to the motion of the tubing engaging portion so that a person manipulating the roller clamp has greater latitude in manipulating the clamp without drastically changing the flow rates. Still further, the small diameter tubing engaging portion clamps the tubing at a concentrated point or area, and the unique construction of the roller clamp including the finger engaging portion and tubing engaging portion in cooperation with a control ramp in the clamp body confines the tubing to eliminate cold flow of the tubing, and exceptionally accurate flow regulation is obtained with the invention. Even further, the roller clamp of the invention does not have any axles or trunnions for the roller clamp, and accordingly, the problem of breakage or warping of the axles or trunnions is eliminated, and the roller clamp of the invention thus runs or rolls with a uniform, accurate motion.

Various types of roller clamps are known in the prior art for controlling flow through flexible tubing, but all such roller clamps known to applicant utilize a roller having axles or trunnions projecting coaxially from opposite sides thereof and with a large diameter finger engaging portion projecting outwardly of a housing, said finger engaging portion comprising also the tubing engaging portion. With such prior art constructions, the axles or trunnions often break or warp causing the roller to run in an oscillating manner, and thus, accurate flow regulation cannot be obtained. Moreover, the utilization of the finger engaging portion as the tubing engaging portion results in a one to one ratio between motion of the finger engaging portion and the tubing clamping portion, and consequently, even slight movements of the finger engaging portion can drastically change the flow rate. Still further, with such prior art devices the tubing engaging portion has a relatively large diameter, and the tubing is thus clamped over a substantial area as opposed to the concentrated clamping pressure exerted with the present invention. Still further, in prior art constructions the roller clamp has a relatively loose fit in the clamp body, and accordingly, the tubing is permitted to cold flow during use of the prior art device.

The present invention solves all of the above problems for the reasons set forth hereinabove.

OBJECTS OF THE INVENTION

It is an object of this invention to provide a roller clamp for tubing wherein the roller clamp does not have axles or trunnions or the like, and thus which operates in a consistent and accurate motion in the clamp body and is not subject to oscillating movement.

Another object of the invention is to provide a roller clamp for tubing wherein the clamp has a tubing engaging portion of relatively small diameter to thus effect clamping of the tubing at a concentrated area or point.

A still further object of the invention is to provide a roller clamp for tubing which has a relatively large diameter finger engaging roller and a relatively small diameter tubing engaging roller coaxial with the finger engaging roller so that greater leverage is obtained for operation of the roller clamp and additionally, which results in reduced motion of the finger engaging roller relative to the tubing engaging roller so that greater latitude of operation of the finger engaging roller is permitted without drastically changing the flow rates.

Yet another object of the invention is to provide a roller clamp for tubing wherein the roller clamp and clamp body are uniquely constructed to confine or contain the tubing on a control ramp to eliminate cold flow of the tubing and to provide a constant opening through the tubing to obtain consistent flow rates over long periods of time.

Still another object of the invention is to provide a roller clamp for tubing wherein means are provided for effecting quick shutoff of flow through the tubing without requiring manipulation of the roller clamp itself.

BRIEF DESCRIPTION OF THE DRAWINGS

FIGS. 5, 6, and 7 are views in section taken along lines 5—5, 6—6, and 7—7 respectively, in FIG. 4.

BRIEF DESCRIPTION OF THE INVENTION

Figure 1:
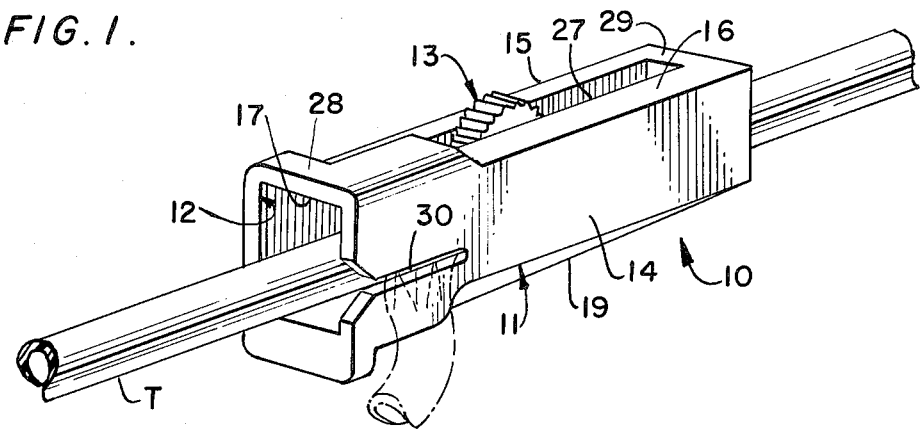
FIG. 1 is a perspective view of a roller clamp for tubing according to the invention.
Figure 2:
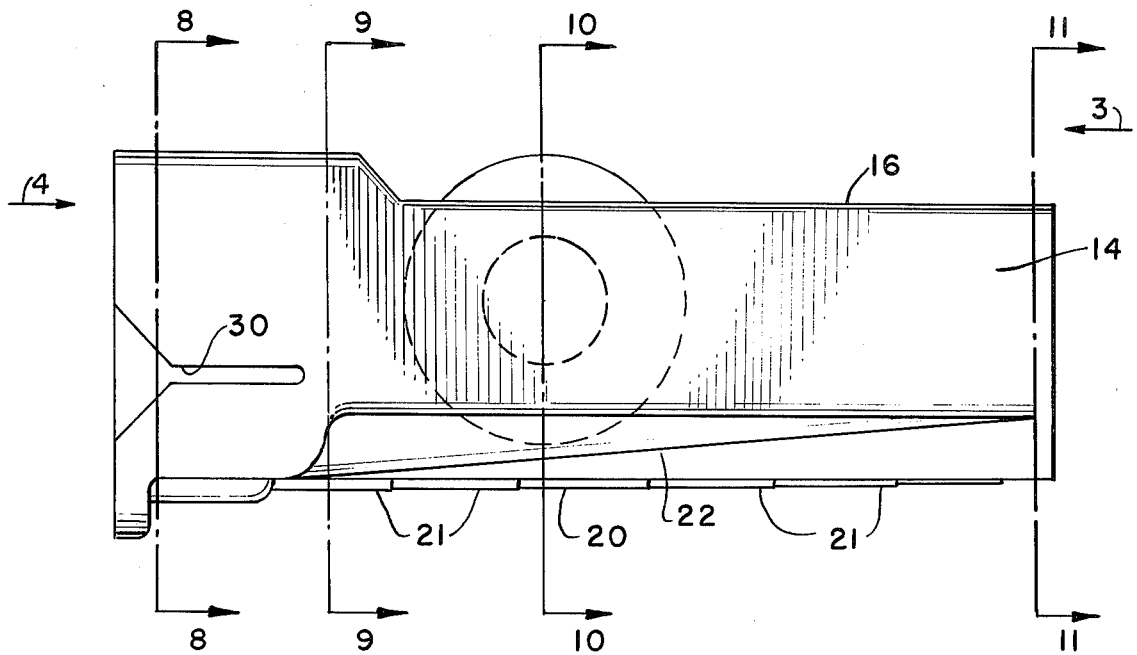
FIG. 2 is an enlarged view in elevation of the roller clamp of FIG. 1.
Figure 3:
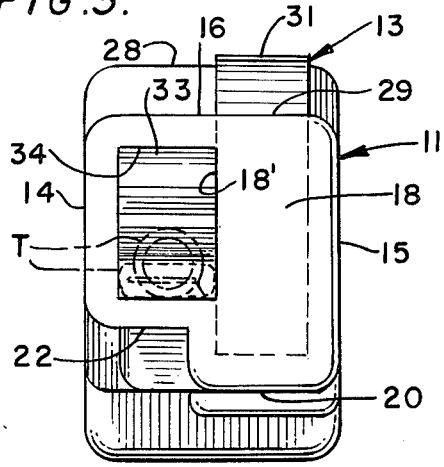
FIG. 3 is an end view looking toward the right hand end of the clamp in FIG. 2.
Figure 4:
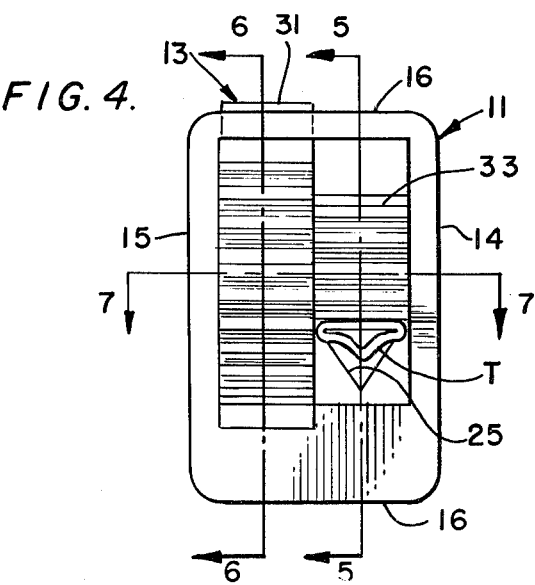
FIG. 4 is an end view of the clamp looking toward the left hand end of the clamp in FIG. 2.
Figure 8:
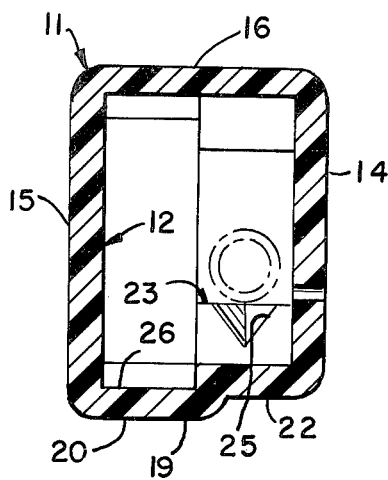
FIGS. 8, 9, 10, and 11 are views in section taken along lines 8—8, 9—9, 10—10, and 11—11 respectively, in FIG. 2.
Figure 9:
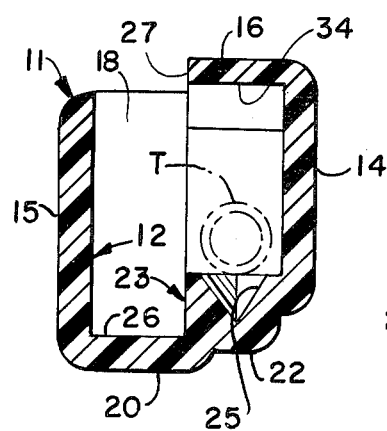
Figure 10:
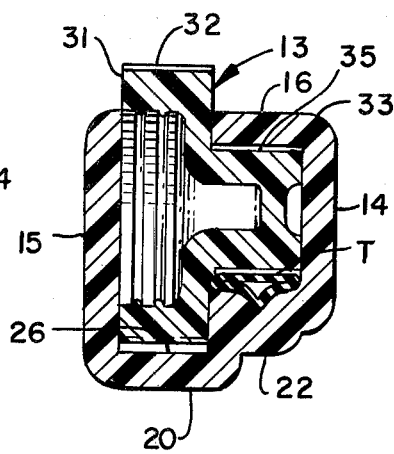
Figure 11:
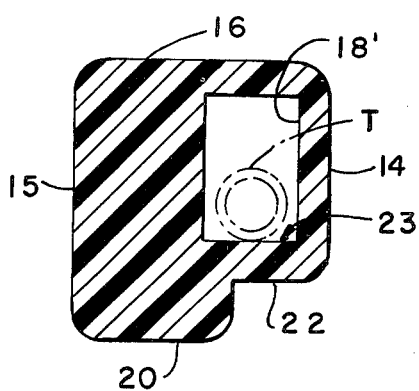

In the drawings, wherein like reference numerals indicate like parts throughout the several views, a roller clamp 10 includes an elongate tubular clamp body 11 having an axially extending opening 12 therethrough and a roller 13 positioned in the opening 12 for rolling movement axially of the clamp body 11 to control flow through a length of flexible tubing T extended axially through the opening 12 in the clamp body 11. The clamp body 11 includes opposite side walls 14 and 15, a top wall 16, an open end 17, a closed end 18 having an opening 18' therethrough, and a bottom wall 19. The bottom wall 19 includes two longitudinally extending portions, one of said portions 20 being substantially parallel to top wall 16 and having a plurality of steps or offset portions 21 on the bottom surface thereof defining finger gripping means for greater ease in manipulating the clamp body 11. The other portion 22 slopes upwardly from near one end of the clamp body to the other end thereof. A control ramp 23 is in the opening 12 integral with the bottom wall 19 thereof and is formed on the inner surface of sloping bottom wall portion 22 and is substantially comensurate in length and width with the bottom wall portion 22 and extends transversely approximately one-half the width of opening 12 through the clamp body 11. The ramp 23 includes an upper surface 24 substantially parallel to top wall 16 and having a V-shaped channel 25 therein extending from one end of the ramp to the other end thereof and of decreasing depth from said one end to the other end thereof. The inner surface of bottom wall portion 20 defines a longitudinally extending runway 26 extending substantially throughout the length of the clamp body 11 and having a width substantially equal to one-half the width of bottom wall 19. Top wall 16 of the clamp body 11 has a longitudinally extending slot 27 therein extending throughout the major portion of the length of clamp body 11 but terminating short of the opposite ends thereof defining stops 28 and 29 at opposite ends of the clamp body for the roller or roller clamp 13 therein. Side wall 14 of clamp body 11 has a longitudinally extending slot 30 therein extending from said one open end 17 of the clamp body axially inwardly along side wall 14 to a point near one end of the ramp 23 and into which the tubing T may be pulled as indicated in the phantom lines in FIG. 1 to shut off flow through the tubing without changing the setting or position of roller clamp 13.

The roller clamp 13 comprises a circular finger engaging portion 31 having opposite faces and a serrated outer peripheral surface 32 and a diameter greater than the distance from runway 26 to the slot 27 and top wall 16 so that the finger engaging portion 13, while resting on the runway 26, projects upwardly through the slot 27 for engagement thereof exteriorly of the body 11 for manipulation of the roller clamp axially of the body. The roller 13 also includes a tube clamping portion 33 projecting from one side or face of the finger engaging portion 31 coaxially therewith and having a substantially reduced diameter in relation to the diameter of the finger engaging portion and of such size as to fit within a channel 34 defined between top wall 16 and upper surface 24 of ramp 23. The tube clamping portion 33 also has a serrated outer peripheral surface 35, and the length of tube clamping portion 33 is substantially the same or slightly less than the width of ramp 23, while the finger engaging portion 31 has a width substantially equal to or slightly less than the width of slot 27 in top wall 16.

Then, in use, a length of tubing T is inserted through the axial opening 12 and clamp body 11 and beneath the tube clamping portion 33 of the roller clamp 13 in overlying relationship to the upper surface 24 of ramp 23. The serrated outer surface 32 of finger engaging portion 31 is then engaged with the finger to roll the clamp 13 axially of the body and engagement of the finger engaging portion with the runway 26 prevents downward movement of the tube clamping portion 33 relative to the tube T, and an accurate regulation of flow through the tubing can thus be obtained. By changing the position of the roller along the clamp body and thus of the tube clamping portion 33 along the ramp 23, the tube T is caused to be deformed into the channel 25 in the ramp 23 at a selected point along the length thereof to obtain a desired flow rate. The relatively close fit of the roller clamp 13 in the opening 12 of clamp body 11 confines or contains the tube T between the side of finger engaging portion 31 and between the tube clamp portion 33 and upper surface 24 of ramp 23 to prevent cold flow of the tube during use of the device. The flow through the tube T can be regulated from zero with the roller clamp positioned at the right hand end of the clamp body as seen in FIG. 7, for example, wherein the channel 25 has a minimum depth, to maximum flow with the tube clamp 13 positioned to the left hand end of the clamp body 11 as seen in FIG. 7, whereat the channel 25 has a maximum depth.

The clamp body 11 and roller 13 are preferably made of polypropylene or similar acceptable material and in a specific example of a roller clamp constructed in accordance with the invention, the clamp body has an overall length of approximately 1.875 inches and is approximately 0.5 inches wide and about 0.75 inches high. The groove 25 is about 1.3 inches long and is about 0.100 inch deep at its deepest part. The channel 34 in which the tube clamp portion 33 is received, is approximately 0.270 inches high and about 0.195 inches wide, whereas the tube clamp portion 33 of the roller 13 is approximately 0.250 inches in diameter and has a length of about 0.177 inches. The slot 30 in side wall 14 for shutting off flow through the tube T is approximately 0.020 inches wide and has a length of about 0.375 inches. These specific dimensions are for example only and are for a specific construction of the device, and other dimensions could obviously be utilized in the construction of the device of the invention.

Figure 12:
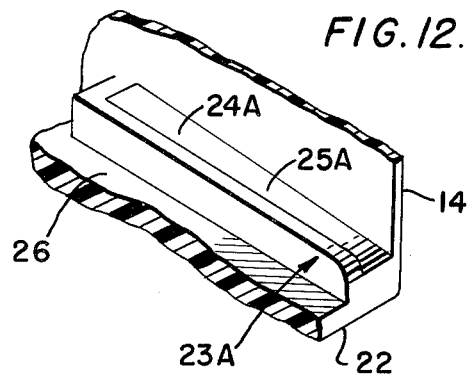
FIGS. 12, 13, and 14 are fragmentary perspective views of alternate designs of the ramp and flow controlling channel therein for use in the clamp of the present invention.
Figure 13:
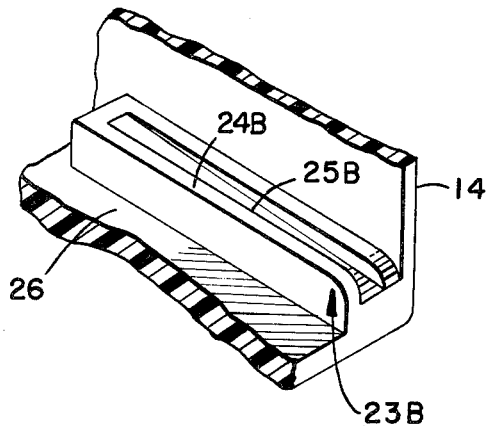
Figure 14:
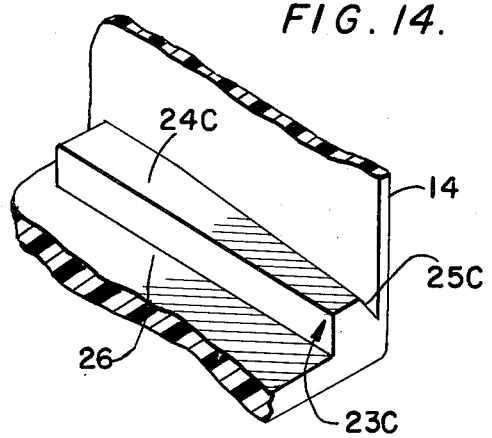

In FIGS. 12, 13, and 14, modifications of the ramp and flow control channel are illustrated, and in FIG. 12, a ramp 23a has an upper surface 24a with a channel 25a therein, the channel having a flat bottom as distinguished from the V-shaped bottom of channel 25 in the previously described embodiment. In FIG. 13, a ramp 23b also has an upper surface 24b in which a channel 25b is formed, said channel 25b also having a flat bottom wall but being formed intermediate the opposite sides of upper surface 24b rather than at one side thereof as in FIG. 12. In FIG. 14, a ramp 23c has an upper surface 24c and a V-shaped channel 25c is formed at one side of surface 24c and extends from one end thereof toward the other end thereof.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A roller clamp for tubing, comprising an elongate tubular body having an axially extending opening therethrough, a ramp at one side of the opening, said ramp having an elongate, axially extending channel therein of increasing depth toward one end thereof, said body having a runway in an inner bottom surface thereof extending longitudinally of the body in parallel relationship to said ramp, and a roller mounted in said axially extending opening for rolling movement therealong, the roller comprising a circular finger engaging portion having opposite faces and a peripheral finger engaging portion accessible exteriorly of the body for manually rolling the roller axially of the body, said peripheral portion of said finger engaging portion supported on said runway for rolling movement along said runway, and a tubing engaging portion extending coaxially from one face of the finger engaging portion, said tubing engaging portion being of reduced diameter relative to the finger engaging portion and having a peripheral outer surface and projecting transversely across the ramp and channel for clamping a length of flexible tubing between the peripheral outer surface of the tubing engaging portion and the ramp and between a side wall of the body and said one face of the finger engaging portion to deform a portion of the tubing into the channel and thus control flow through the tubing.

2. A roller clamp as in claim 1, wherein said body is substantially rectangular in cross section and has a top wall, a bottom wall, and opposite side walls, said top wall having an elongate slot therethrough, said finger engaging portion being of a diameter as to extend from the bottom wall outwardly through the slot and beyond the top wall.

3. A roller clamp as in claim 1, wherein the finger engaging portion and the tubing engaging portion of the roller are both circular, and said tubing engaging portion has a diameter approximately one-half as great as the diameter of the finger engaging portion.

4. A roller clamp as in claim 3, wherein the opening through the body has a cross sectional shape and size substantially complemental to the roller, said opening having a portion of reduced size in which said tubing engaging portion is received, and a portion of larger size in which said finger engaging portion is received.

5. A roller clamp as in claim 1, wherein the ramp is shorter in length than the body, and said channel is approximately the same length as the ramp.

6. A roller clamp as in claim 5, wherein the ramp has an upper surface on which a length of flexible tubing is positioned when in use, and the tubing engaging portion extends transversely across said upper surface in opposed relationship thereto.

7. A roller clamp as in claim 6, wherein said channel is in said upper surface intermediate the opposite longitudinal edges thereof.

8. A roller clamp as in claim 7, wherein the channel is V-shaped in transverse cross section.

9. A roller clamp as in claim 7, wherein the channel is substantially rectangular in transverse cross section.

10. A roller clamp as in claim 6, wherein said channel extends along one longitudinal side edge of said upper surface.

11. A roller clamp as in claim 10, wherein the channel is V-shaped in transverse cross section.

12. A roller clamp as in claim 10, wherein the channel is substantially rectangular in transverse cross section.

* * * * *